(12) United States Patent
Maruyama et al.

(10) Patent No.: US 10,564,365 B2
(45) Date of Patent: Feb. 18, 2020

(54) CONNECTOR FOR OPTICAL FIBERS WITH LENSES

(71) Applicant: TOYO SEIKAN GROUP HOLDINGS, LTD., Tokyo (JP)

(72) Inventors: Naofumi Maruyama, Kanagawa (JP); Yuri Tamura, Kanagawa (JP); Taro Suzuki, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/580,464

(22) PCT Filed: May 13, 2016

(86) PCT No.: PCT/JP2016/064372
§ 371 (c)(1),
(2) Date: Dec. 7, 2017

(87) PCT Pub. No.: WO2017/013930
PCT Pub. Date: Jan. 26, 2017

(65) Prior Publication Data
US 2018/0143383 A1    May 24, 2018

(30) Foreign Application Priority Data

Jul. 22, 2015    (JP) .................................. 2015-144667

(51) Int. Cl.
*G02B 6/38* (2006.01)
*G02B 6/26* (2006.01)

(52) U.S. Cl.
CPC ........... *G02B 6/3853* (2013.01); *G02B 6/262* (2013.01); *G02B 6/3874* (2013.01); *G02B 6/3882* (2013.01); *G02B 6/3885* (2013.01)

(58) Field of Classification Search
CPC .. G02B 6/3853; G02B 6/3882; G02B 6/3874; G02B 6/3885
See application file for complete search history.

(56) References Cited

U.S. PATENT DOCUMENTS 5,692,081 A    11/1997    Takahashi
7,346,237 B2    3/2008    Matsumura et al.
(Continued)

FOREIGN PATENT DOCUMENTS

CN    103676022    3/2014
CN    103975263    8/2014
(Continued)

OTHER PUBLICATIONS

Written Opinion with English Translation in respect to International Application No. PCT/JP2016/064372, dated Aug. 2, 2016.
(Continued)

*Primary Examiner* — Sung H Pak
*Assistant Examiner* — Hoang Q Tran
(74) *Attorney, Agent, or Firm* — Greenblum & Bernstein, P.L.C.

(57) ABSTRACT

A connector for optical fibers with lenses includes a ferrule to which an optical fiber with a lens is mounted and which has an end face inclined relative to a central axis, and a coupling member (sleeve) which coaxially couples a pair of the ferrules by making the ferrules to face each other in a non-contact state such that the end faces are parallel to each other. The ferrule has one or a plurality of holes which are parallel to the central axis at positions decentered from the central axis, the optical fiber with the lens being disposed in the hole, and the optical fibers with the lenses mounted to the pair of the ferrules have lens end faces which are inclined along the end faces of the ferrules so as to be optically coupled to each other.

12 Claims, 7 Drawing Sheets

(56) References Cited

U.S. PATENT DOCUMENTS

| | | | |
|---|---|---|---|
| 7,505,658 B2 | 3/2009 | Imaki et al. | |
| 7,580,606 B2 | 8/2009 | Imaki et al. | |
| 7,634,166 B2 | 12/2009 | Imaki et al. | |
| 9,360,632 B2 | 6/2016 | Arao et al. | |
| 2003/0179993 A1* | 9/2003 | Shigenaga | G02B 6/32 385/33 |
| 2004/0175073 A1* | 9/2004 | Grinderslev | G02B 6/32 385/34 |
| 2006/0045419 A1 | 3/2006 | Matsumura et al. | |
| 2008/0089648 A1 | 4/2008 | Imaki | |
| 2009/0003773 A1 | 1/2009 | Imaki et al. | |
| 2009/0003774 A1 | 1/2009 | Imaki et al. | |
| 2011/0091156 A1* | 4/2011 | Laughlin | C03C 8/02 385/34 |
| 2014/0178010 A1* | 6/2014 | de Jong | G02B 6/3853 385/79 |
| 2014/0205236 A1 | 7/2014 | Noguchi et al. | |
| 2015/0104135 A1* | 4/2015 | Bushnell | G02B 6/325 385/79 |
| 2016/0085030 A1 | 3/2016 | Arao et al. | |
| 2016/0341909 A1* | 11/2016 | Childers | G02B 6/3853 |

FOREIGN PATENT DOCUMENTS

| | | |
|---|---|---|
| JP | 08-201644 | 8/1996 |
| JP | 2003-121679 | 4/2003 |
| JP | 2004-537065 | 12/2004 |
| JP | 2005-037731 | 2/2005 |
| JP | 2005-37731 | 2/2005 |
| JP | 2005-115097 | 4/2005 |
| JP | 2008-020560 | 1/2008 |
| JP | 2008-096655 | 4/2008 |
| JP | 2008-96655 | 4/2008 |
| JP | 2009-047993 | 3/2009 |
| JP | 4440925 | 1/2010 |
| JP | 2016-061942 | 4/2016 |
| WO | 03/010564 | 2/2003 |

OTHER PUBLICATIONS

International Search Report with English Translation with respect to International Application No. PCT./JP2016/064372, dated Aug. 2, 2016.
EP Office Action dated Jan. 25, 2019 and issued in EP 16827494 (11 pages).
Korean Office Action issued in Application No. 10-2018-7000062 dated Apr. 17, 2019 with English translation.
Chinese Office Action issued in Application No. 201680042797 dated Jun. 27, 2019 with English translation.
Chinese Office Action issued in Application No. 201680042797 dated Sep. 16, 2019 with English translation.

* cited by examiner

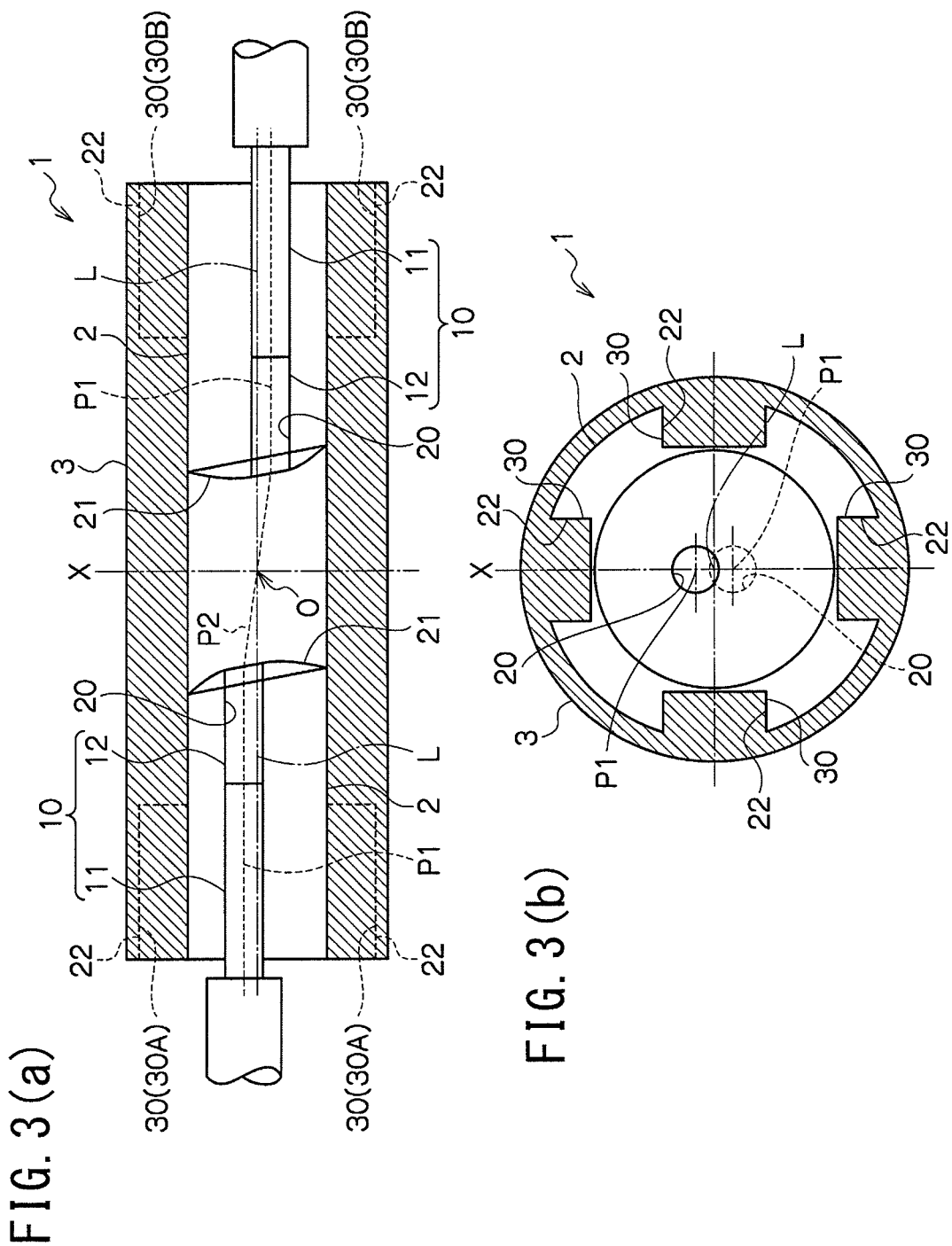

CONNECTOR FOR OPTICAL FIBERS WITH LENSES

TECHNICAL FIELD

The present invention relates to a connector for optical fibers with lenses which connects optical fibers with lenses together.

BACKGROUND ART

In connection between optical fibers, in order to prevent reflected return light on an optical fiber end face, it is generally known that the optical fibers having end faces formed into an oblique shape are made to face each other, and it is proposed to position a pair of optical fibers in grooves, the axes of which are displaced from each other, such that the end faces of the optical fibers which face each other are substantially parallel to each other and the emission optical axis of one of the optical fibers coincides with the core center of the other optical fiber (see PTL 1).

On the other hand, as an optical fiber with lens, there is known an optical fiber collimator which emits light emitted from an optical fiber as parallel light using a lens, and there is known an optical fiber with GRIN lens which uses a GRIN lens (gradient index lens) as the lens and has the end part of the optical fiber welded to the center of the GRIN lens.

In connection between the optical fibers with lenses, by coaxially disposing the optical fibers with lenses such that the optical fibers with lenses face each other, light emitted from one of the optical fibers becomes parallel light by one of the lenses, and the parallel light is focused by the other lens and enters the other optical fiber. In the connection between the optical fibers with lenses serving as optical collimators, a sufficient interval is provided between lens end faces (see PTL 2 shown below).

In the connection between the optical fibers with lenses described above, there is known a connector in which the end part of the optical fiber with lens is mounted to the center of a ferrule and a pair of the ferrules are coaxially made to abut on each other by a cylindrical sleeve (see PTL 3 shown below).

In the connection between the optical fibers with lenses (optical fiber collimators) as well, the prevention of the reflected return light is a major task and, in order to achieve this task, it is known that the emission end face of the lens is obliquely formed, and it is known that, in order to connect the optical fibers with lenses having the obliquely inclined emission end faces, the optical fiber with lens is supported by a groove on a board (see PTL 4 shown below).

CITATION LIST

Patent Literature

[PTL 1] Japanese Patent Application Publication No. 2003-121679
[PTL 2] Japanese Patent Application Publication No. 2008-20560
[PTL 3] Japanese Translation of PCT Application Publication No. 2004-537065
[PTL 4] Japanese Patent No. 4440925

SUMMARY OF INVENTION

Technical Problem

In the connection between the optical fibers with lenses, there is a high need for a connector connection which allows easy attachment and detachment.

In the connector connection between the optical fibers with lenses, it is possible to reduce the energy density of emitted light by beam expansion by the collimator, and connect the optical fibers with lenses together in a state in which connection end faces are not in contact with each other. With the reduction in energy density, it is possible to avert a phenomenon in which the connection end face and the inside of the fiber are damaged by heat generation caused by concentration of energy on a foreign object and a fiber fuse resulting from the heat generation. In addition, by preventing the connection end faces from coming into contact with each other, optical coupling is allowed even when a small foreign object is present on the connection end face, it is possible to save labor such as cleaning of the connection end face, and it is also possible to avert the occurrence of a dent or a chip of the end face caused by the insertion and extraction of the connector.

However, as described above, the reflected return light on the connection end face is a significant problem also in the connection between the optical fibers with lenses. In the connector connection between the optical fibers with GRIN lenses in which the connection end faces are not in contact with each other, when the tip face of the GRIN lens is positioned perpendicular to an optical axis, most of the reflected return light on the tip face of the GRIN lens which is generated due to a difference in refractive index between the GRIN lens and an air layer enters the core of the optical fiber, and is transmitted in a backward direction (back reflection). Accordingly, even when an anti-reflection coating (AR coating) is applied to the tip face, the back reflection is increased to about −30 dB, and a light source or the like is adversely affected.

To cope with this, there is known a countermeasure in which the tip face of the GRIN lens is obliquely polished (see PTL 4) and, with this, it is possible to limit the back reflection to −50 dB or less. However, as shown in FIG. 1, in the case where optical fibers with GRIN lenses having GRIN lenses J2 welded to the end faces of optical fibers J1 are connected to each other, when the end face of the GRIN lens J2 is inclined, light from the end face is emitted at an angle θ relative to a machine axis P, and hence a connection in which parallelism of the inclined end face and an offset amount of a pair of the optical fibers with GRIN lenses are adjusted is required. Accordingly, even if the optical fiber with GRIN lens is mounted to the center of the ferrule and the connector connection is to be performed, when the end face of the GRIN lens J2 is inclined, it is not possible to coaxially dispose the ferrules in the cylindrical sleeve.

In the connection in the case where the end face of the optical fiber or the end face of the optical fiber with lens is inclined relative to the machine axis, the optical fiber or the optical fiber with lens is held and fixed using a groove in order to set the parallelism of the end face and the offset amount of the optical fibers or the optical fibers with lenses which are connected to each other with high accuracy (see PTL 1 and PTL 4). In such a conventional technique, it is not possible to obtain the detachable connector connection with this conventional art. In addition, even when a sleeve which can detachably hold the optical fibers with lenses is to be formed such that the optical fibers with lenses are connected to each other in the state shown in FIG. 1, there has been a problem that it is difficult to inexpensively manufacture the sleeve with high accuracy in the case where zirconia (ceramic) suitable as the sleeve material is used.

In the present invention, coping with such a problem is an example of the task. That is, an object of the present invention is, for example, to provide an inexpensive and highly accurate detachable connector by suppressing the back reflection by inclining the end faces relative to the machine axis when the optical fibers with lenses are connected to each other in a state in which the end faces are not in contact with each other.

Solution to Problem

In order to achieve the above object, the connector for optical fibers with lenses according to the present invention includes the following configuration.

A connector for optical fibers with lenses including a ferrule to which an optical fiber with lens is mounted and which has an end face inclined relative to a central axis, and a coupling member which coaxially couples a pair of the ferrules by making the ferrules to face each other in a non-contact state such that the end faces are parallel to each other, wherein the ferrule includes one or a plurality of holes which are parallel to the central axis at a position decentered from the central axis, the optical fiber with lens being disposed in the hole, and the optical fibers with lenses mounted to the pair of the ferrules have lens end faces inclined along the end faces of the ferrules so as to be optically coupled to each other.

Advantageous Effects of Invention

According to the connector for optical fibers with lenses of the present invention having such features, by having the above-described features, it is possible to provide the inexpensive and highly accurate detachable connector by suppressing the back reflection by inclining the lens end faces relative to the machine axis when the optical fibers with lenses are connected to each other in the state in which the end faces are not in contact with each other and by using the coupling member which coaxially connects the pair of the ferrules together.

BRIEF DESCRIPTION OF DRAWINGS

FIG. 3 is an explanatory view (FIG. 3(a) is a transverse sectional view and FIG. 3(b) is a longitudinal sectional view) showing a specific example of the connector for optical fibers with lenses which is the embodiment of the present invention.

DESCRIPTION OF EMBODIMENTS

Figure 1:
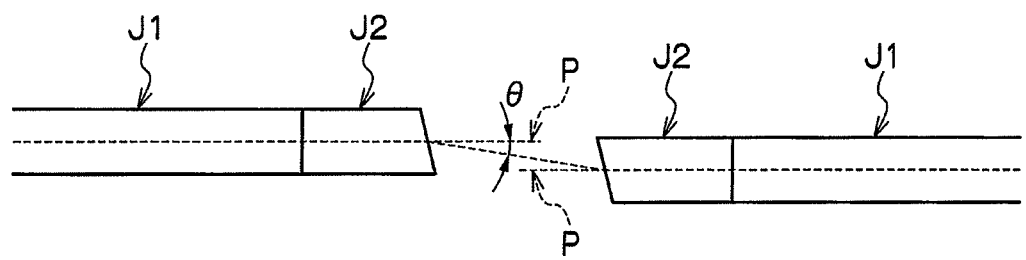
FIG. 1 is an explanatory view showing a connection state of optical fibers with lenses having inclined end faces.
Figure 2A:
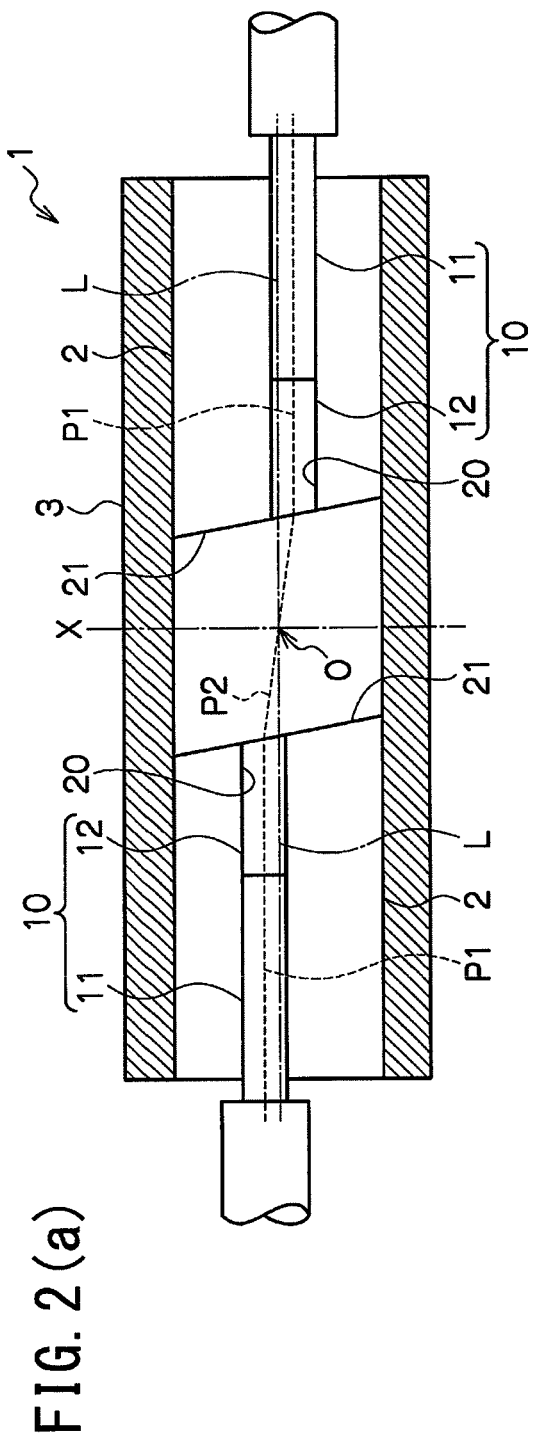
FIG. 2 is an explanatory view (FIG. 2(a) is a transverse sectional view and FIG. 2(b) is a longitudinal sectional view) showing a connector for optical fibers with lenses which is an embodiment of the present invention.
Figure 2B:
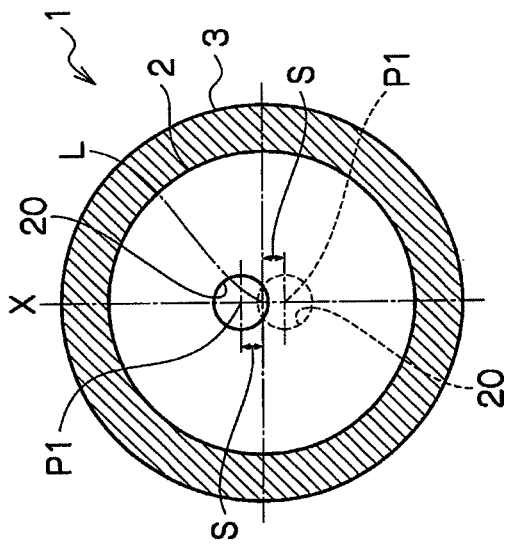

Hereinafter, embodiments of the present invention will be described with reference to the drawings. In the following description, the same reference numerals in different drawings denote the same parts, and duplicate description will be appropriately omitted. As shown in FIG. 2, a connector for optical fibers with lenses 1 according to the embodiment of the present invention makes optical fibers with lenses 10 in which end parts of optical fibers 11 are connected to the centers of lenses (GRIN lenses) 12 by welding to face each other, and performs optical coupling of the optical fibers with lenses 10, and includes a pair of ferrules 2 to which the optical fibers with lenses 10 are mounted, and a sleeve 3 serving as a coupling member which coaxially couples the pair of ferrules 2 by making the ferrules 2 to face each other in a non-contact state.

The pair of ferrules 2 provided with the optical fibers with lenses 10 are identical to each other, and are disposed so as to face each other. As the optical fiber 11, it is possible to use a single mode optical fiber, a large mode area (LMA) optical fiber, a polarization preserving (polarization maintaining) optical fiber, a multimode optical fiber, a multicore optical fiber, and the like. The outer diameter of the lens 12 may be different from the outer diameter of a clad of the optical fiber 11, but is preferably equal to that of the clad thereof. The outer diameter of the lens 12 is 125 μm (124.5 to 125.5 μm) in the single mode optical fiber which is used in the field of, e.g., general optical communications.

Each ferrule 2 has a hole 20 which is formed along a central axis L of a cylindrical body inside the cylindrical body, and the end part of the optical fiber with lens 10 is inserted into the hole 20 and is fixed. In addition, the ferrules 2 have end faces 21 which face each other, and the end faces 21 are inclined relative to the central axis L. In the ferrules 2 described above, the end faces 21 of the ferrules 2 are inclined and lens end faces of the optical fibers with lenses 10 are inclined along the end faces 21 such that a pair of the optical fibers with lenses 10 are optically coupled to each other. In an example in the drawing, the end faces 21 of the ferrules 2 and the lens end faces of the optical fibers with lenses 10 are inclined such that an optical axis P2 of the optical fibers with lenses 10 which are optically coupled to each other between the pair of the ferrules 2 intersects an extension of the central axis L.

In each ferrule 2, the hole 20 which is parallel to the central axis L is formed at a position decentered by a distance S from the central axis L of the outer circumference, and the optical fiber with lens 10 is mounted to the hole 20, whereby a machine axis P1 of the optical fiber with lens 10 is decentered by the distance S from the central axis L.

The sleeve 3 which coaxially holds the pair of the ferrules 2 positions and holds the ferrules 2 around the central axis L such that the end faces 21 of the pair of the ferrules 2 face each other so as to be symmetrical about a point O at which the optical axis P2 of the optical fibers with lenses 10 which are optically coupled to each other between the pair of the ferrules 2 intersects the extension of the central axis L of the outer circumference of the ferrule 2.

The central axes L of the pair of the ferrules 2 are coaxially disposed so as to coincide with the central axis of the sleeve 3 by being held by the sleeve 3. A distance between the end faces 21 of the ferrules 2 which face each other in the sleeve 3 is appropriately set such that light emitted from the optical fiber with lens 10 mounted to one of the ferrules 2 according to an emission angle θ corresponding to the inclination angle of the end face 21 enters the optical fiber with lens 10 mounted to the other ferrule 2 through the point O. With this, high-efficiency optical coupling between a pair of the optical fibers with lenses 10 is allowed by a simple mechanical engagement in which the pair of the ferrules 2 are made to abut on each other in the sleeve 3.

The inclination angle of each of the end face 21 of the ferrule 2 and the end face of the optical fiber with lens 10 may be any angle as long as the angle allows inhibition of reflected return light on the end face and suppression of back reflection. Specifically, the inclination of 4° or more, preferably 6° or more, and further preferably 8° or more with respect to a plane X perpendicular to the optical axis allows effective suppression of the back reflection.

FIG. 3 shows a more specific example of the configuration of the connector for optical fibers with lenses 1. In this example, in the connector for optical fibers with lenses 1, the ferrule 2 includes engaging parts 22 which restrain rotation about the central axis L, and the sleeve 3 includes engaged parts 30 which are engaged by the engaging parts 22 of the ferrule 2. In the example shown in the drawing, the engaging part 22 is a flange part provided on the outer circumference of the ferrule 2, and the engaged part 30 is a convex or concave part provided to extend along the central axis L inside the sleeve 3.

The engaging part 22 of the ferrule 2 engages the engaged part 30 of the sleeve 3, whereby the ferrule 2 is positioned and held around the central axis L in the sleeve 3, and is further positioned such that an interval between the end faces 21 corresponds to a set distance in the sleeve 3. Herein, the engaged part 30 (30A) provided on one end side of the sleeve 3 and the engaged part 30 (30B) provided on the other end side of the sleeve 3 are disposed at positions 180° apart around the central axis L. With this, when the ferrules 2 which are identical to each other are inserted into the sleeve 3 and are made to abut on each other, by the engagement between the engaging part 22 and the engaged part 30, it is possible to position the ferrules 2 such that the end faces 21 of the ferrules 2 face each other so as to be symmetrical about the point O.

The engaging part (flange part) 22 of the ferrule 2 is disposed at a specific position around the central axis L in a decentering direction toward the machine axis P1 of the optical fiber with lens 10 from the central axis L. That is, the relationship between the position of the engaging part 22 around the central axis L and the decentering direction of the machine axis P1 is uniquely determined. With this, in polishing when the inclined face is formed on the end face 21, it is possible to easily perform working for making the direction of the inclined face to coincide with the decentering direction. When the ferrule 2 is set in an apparatus for performing the polishing, the end face 21 of the ferrule 2 is fixed with the position of the engaging part 22 directed in a specific direction, and the polishing direction is set for the fixed end face 21. With regard to working of the end face 21, as shown in FIG. 3, the end face 21 may be formed into a curved face. In addition, an anti-reflection coating which uses a dielectric multilayer film or the like may be applied to the end face 21 for the purpose of, for example, reducing Fresnel reflection to improve transmittance or further suppressing the back reflection. Further, the end face 21 can also be coated with a functional film having other functions.

Taking these advantages of the connector for optical fibers with lenses 1, first, since an emitted light beam is expanded by the lens (GRIN lens) 12 welded to the end part of the optical fiber 11, in a high power use in large-capacity transmission, it is possible to avert a problem such as damage to the end face 21 caused by a burn by heat generation or a fiber fuse even in the case where a foreign object adheres to the end face 21 by dissipating an energy density on the end face 21.

In addition, by preventing the end faces 21 from coming into contact with each other, it is possible to save labor such as cleaning of a foreign object or dirt on the end face 21 and, further, it is possible to solve a problem that a dent or a chip occurs on the end face 21 at the time of the insertion and extraction of the connector connection.

Furthermore, by inclining the end face 21, it becomes possible to suppress the back reflection, and it is possible to implement the connector connection which does not require axis adjustment using the ferrule 2 and the sleeve 3.

Further, it is also possible to apply optical design which obtains optical coupling via "beam waist" disclosed in PTL 2 to the optical fiber with lens 10. In this case, it is possible to design the optical fiber with lens 10 such that the position of the beam waist is positioned on the plane X.

Figure 4:
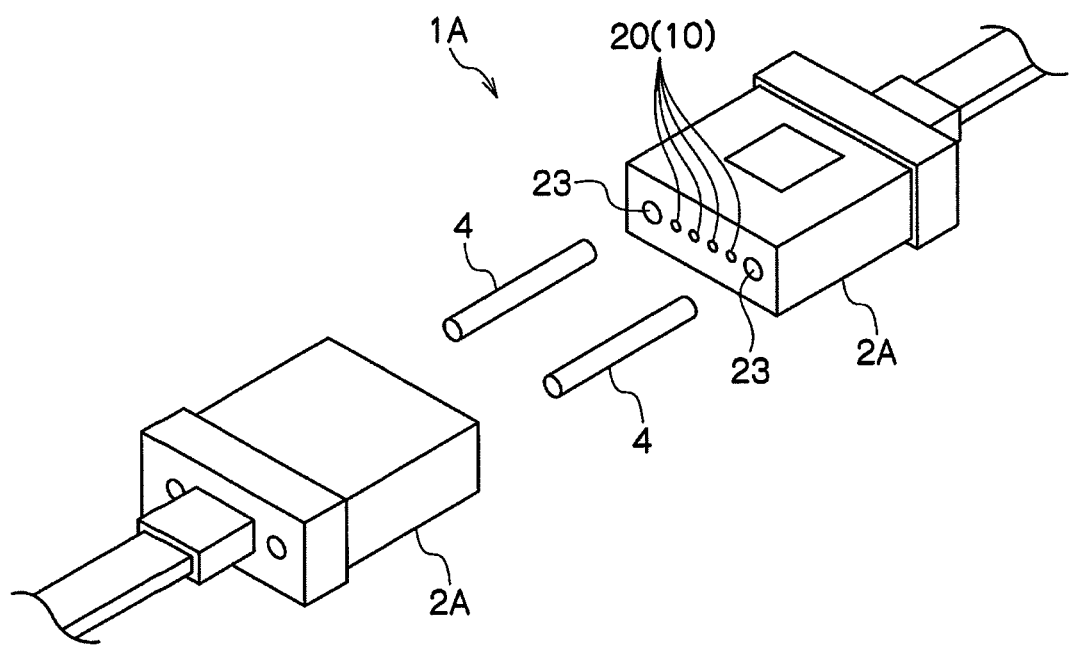
FIG. 4 is an explanatory view showing the overall configuration of a connector for optical fibers with lenses (multicore connector) which is an embodiment of the present invention.

FIG. 4 shows a connector for optical fibers with lenses 1A according to another embodiment of the present invention. The connector for optical fibers with lenses 1A is a multicore connector, and includes a pair of ferrules 2A and guide pins 4 serving as a coupling member which coaxially couples the pair of ferrules 2A by making the ferrules 2A to face each other in the non-contact state.

Figure 5A:
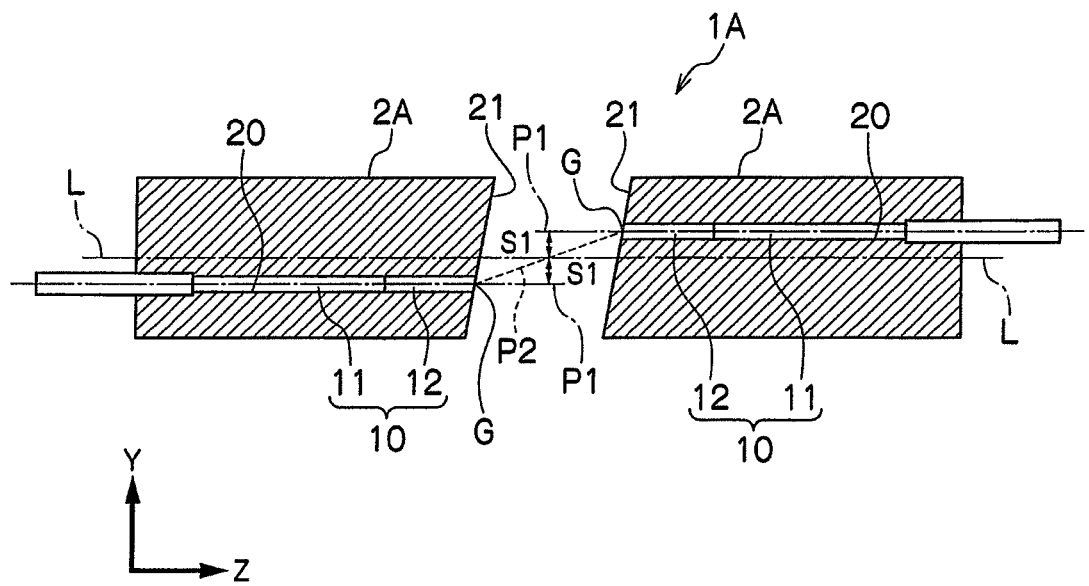
FIG. 5 is an explanatory view (FIG. 5(a) is a cross-sectional view and FIG. 5(b) is a front view of a ferrule) showing the connection state of the connector for optical fibers with lenses (multicore connector) which is the embodiment of the present invention.
Figure 5B:
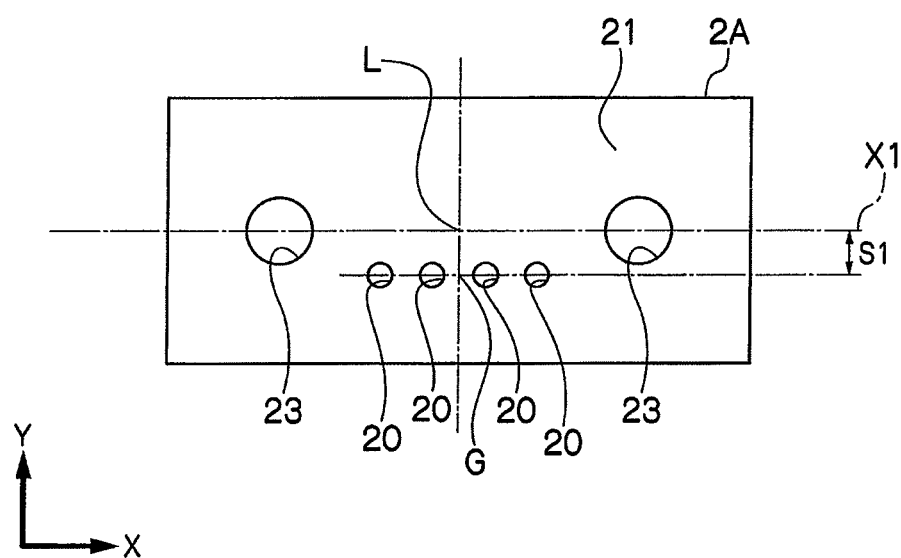
Figure 6A:
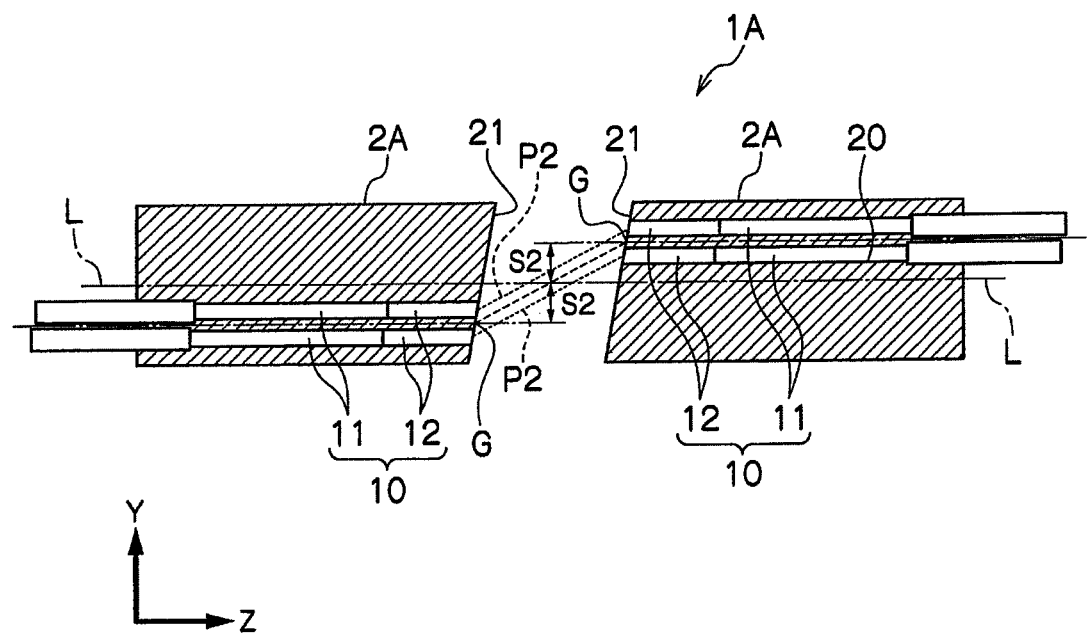
FIG. 6 is an explanatory view (FIG. 6(a) is a cross-sectional view and FIG. 6(b) is a front view of the ferrule) showing the connection state of the connector for optical fibers with lenses (multicore connector) which is the embodiment of the present invention.
Figure 6B:
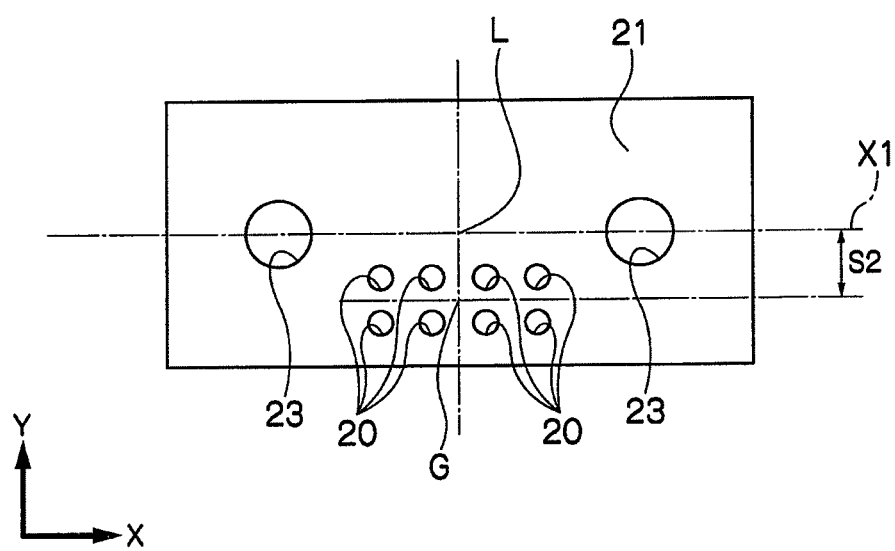
Figure 7A:
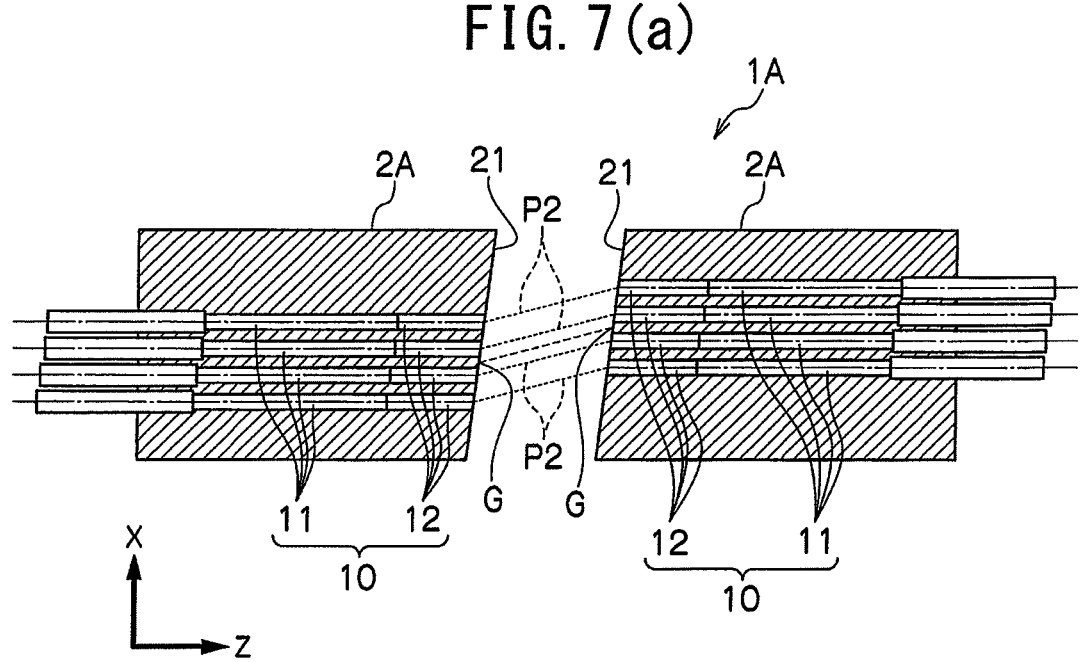
FIG. 7 is an explanatory view (FIG. 7(a) is a cross-sectional view and FIG. 7(b) is a front view of the ferrule) showing the connection state of the connector for optical fibers with lenses (multicore connector) which is the embodiment of the present invention.
Figure 7B:
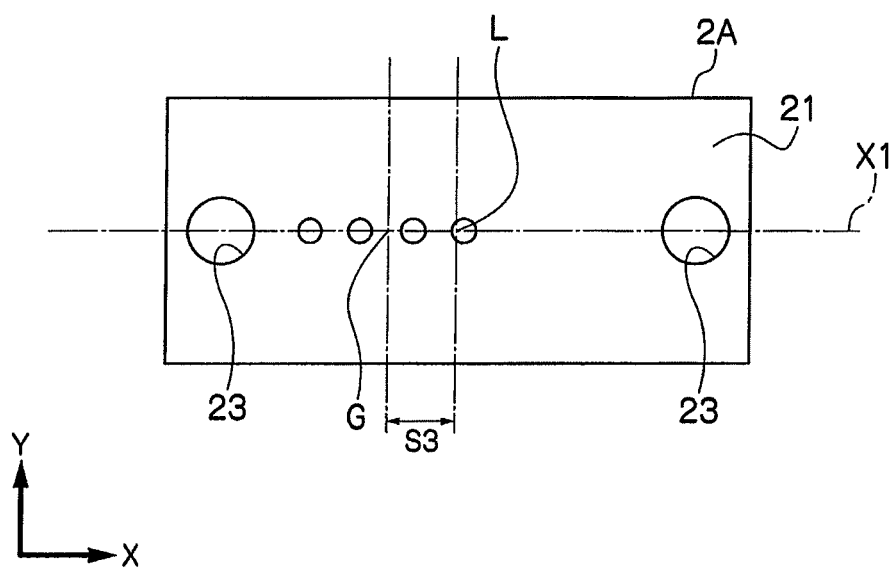

As shown in FIG. 5 to FIG. 7, in the connector for optical fibers with lenses 1A, each ferrule 2A includes a plurality of the holes 20 and a pair of guide holes 23. In an example shown in each drawing, the ferrules 2A have rectangular cross sections, and are disposed so as to face each other with the central axis L directed in a Z direction shown in the drawing. An X direction shown in the drawing is a width direction of the ferrule 2A orthogonal to the direction of the central axis L, and a Y direction shown in the drawing is a thickness direction of the ferrule 2A orthogonal to the direction of the central axis L. The guide hole 23 is formed along the central axis L such that the guide pin 4 is inserted along the central axis L.

In the example shown in each of FIG. 5 to FIG. 7, similarly to the above-described embodiment, the ferrule 2A has the end face 21 which is inclined relative to the central axis. The guide pins 4 are inserted into the guide holes 23 of the pair of the ferrules 2A which face each other to thereby couple the pair of the ferrules 2A such that the end faces 21 are parallel to each other in the non-contact state. Herein, the guide holes 23 are made coaxial by making the ferrules 2A which are identical to each other to face each other in a state in which the ferrules 2A are inverted in the Y direction shown in the drawing, and the guide holes 23 in one ferrule 2A are disposed at positions which are symmetrical vertically and horizontally on the rectangular end face 21.

The optical fibers with lenses 10 disposed in a plurality of the holes 20 in one ferrule 2A include the lenses (GRIN lenses) 12 all having the same lens length, and the end faces of the lenses 12 are inclined in the same direction along the end face 21 of the ferrule 2A. With this, all of the lights emitted from a plurality of the optical fibers with lenses 10 mounted to one ferrule 2A have the optical axes P2 which are parallel to each other.

In the example shown in FIG. 5, in the ferrule 2A, a plurality (four in the drawing) of the holes 20 are arranged at regular intervals in parallel to a straight line X1 which connects the centers of the pair of the guide holes 23. An arrangement center G of the plurality of the holes 20 is disposed at a position decentered from the central axis L by a distance S1 in the Y direction shown in the drawing. Herein, the end face 21 and the end face of the optical fiber with lens 10 are inclined relative to the central axis L such that the optical axis P2 of the optical fibers with lenses 10 which are optically coupled to each other is parallel to a straight line which connects the arrangement centers G in the pair of the ferrules 2A.

In the example shown in FIG. 6, in the ferrule 2A, a plurality (four in the drawing) of the holes 20 are disposed in two rows at regular intervals in parallel to the straight line X1 which connects the centers of the pair of the guide holes 23. In addition, the arrangement center G of the plurality of the holes 20 is disposed at a position decentered from the central axis L by a distance S2 in the Y direction shown in the drawing. In this example as well, similarly to the example shown in FIG. 5, the end face 21 and the end face of the optical fiber with lens 10 are inclined relative to the central axis L such that the optical axis P2 of the optical fibers with lenses 10 which are optically coupled to each other is parallel to the straight line which connects the arrangement centers G in the pair of the ferrules 2A.

In the example shown in FIG. 7, in the ferrule 2A, a plurality (four in the drawing) of the holes 20 are disposed at regular intervals on the straight line X1 which connects the centers of the pair of the guide holes 23. In addition, the arrangement center G of the plurality of the holes 20 is disposed at a position decentered from the central axis L by a distance S3 in the X direction shown in the drawing. In this example as well, similarly to the examples shown in FIG. 5 and FIG. 6, the end face 21 and the end face of the optical fiber with lens 10 are inclined relative to the central axis L such that the optical axis P2 of the optical fibers with lenses 10 which are optically coupled to each other is parallel to the straight line which connects the arrangement centers G in the pair of the ferrules 2A.

According to the embodiment shown in each of FIG. 4 to FIG. 7, in the multicore connector for optical fibers with lenses 1A, it is possible to reduce coupling loss due to dust or the like adhering to the end face 21, by the beam expansion by the lens 12 and by spacing the end faces 21 of the ferrules 2A apart from each other, and it is possible to eliminate the back reflection caused by the end face reflection, by inclining the end face 21. In addition, by increasing the number of cores, it is possible to cope with an increase in the capacity of optical transmission.

The embodiments of the present invention have been described in detail with reference to the drawings thus far. However, a specific configuration is not limited to the embodiments. Changes of design or the like in a range not departing from the spirit of the present invention are included in the present invention. In addition, unless there are contradiction and problems in the objects, the configurations, and the like in particular in the embodiments described above, the techniques of the embodiments can be applied to each other and combined.

REFERENCE SIGNS LIST 1, 1A Connector for optical fibers with lenses
2, 2A Ferrule
3 Sleeve
4 Guide pin
10 Optical fiber with lens
11 Optical fiber
12 Lens (GRIN lens)
20 Hole
21 End face
22 Engaging part
23 Guide hole
30 Engaged part
L Central axis
P1 Machine axis
P2 Optical axis
G Arrangement center

The invention claimed is:

1. A connector for optical fibers with lenses, comprising:
a pair of ferrules having inclined end faces;
a coupling member which coaxially couples the pair of ferrules by making said ferrules face each other in a non-contact state such that the inclined end faces of said ferrules are parallel to each other, wherein
each ferrule of the pair of ferrules includes one or a plurality of holes which have a center axis that is parallel to a central axis of the pair of ferrules and which center axis is located at a position decentered from said central axis,
said one or said plurality of holes of each ferrule having mounted therein an optical fiber with lens such that both the optical fiber and the lens are both arranged in said one or in each of said plurality of holes,
each optical fiber with lens having an inclined lens end face and being mounted such that the inclined lens end faces are inclined along said inclined end faces of said pair of ferrules so as to be optically coupled to each other when light from one end face is emitted at an angle θ relative to a machine axis P passing through the one end face, and
each optical fiber with lens comprises an optical fiber end face connected to a GRIN lens via welding.

2. The connector for optical fibers with lenses according to claim 1, wherein
said coupling member is a pair of guide pins, each said ferrule includes guide holes into which said guide pins are inserted along said central axis.

3. The connector for optical fibers with lenses according to claim 2, wherein the lens end faces of said optical fibers with lenses are inclined such that an optical axis of said optical fibers with lenses which are optically coupled to each other is parallel to a straight line connecting arrangement centers in the pair of said ferrules.

4. The connector for optical fibers with lenses according to claim 2, wherein
said one or said plurality of holes comprises a plurality of holes disposed in parallel to a straight line connecting centers of said guide holes.

5. The connector for optical fibers with lenses according to claim 1, wherein
said coupling member is a sleeve which coaxially holds the pair of ferrules,
the lens end faces of said optical fibers with lenses are inclined such that an optical axis of said optical fibers with lenses which are coupled to each other intersects an extension of said central axis, and
said sleeve makes said ferrules to face each other on the basis of a point at which said optical axis intersects the extension of said central axis, and positions and holds said pair of ferrules around said central axis.

6. The connector for optical fibers with lenses according to claim 5, wherein said sleeve positions and holds said pair of ferrules such that said end faces of the pair of ferrules face each other so as to be symmetrical about a point located between and spaced from said end faces.

7. The connector for optical fibers with lenses according to claim 5, wherein
each ferrule includes an engaging part which restrains rotation about said central axis,
said sleeve includes an engaged part which is engaged by said engaging part.

8. The connector for optical fibers with lenses according to claim 7, wherein said engaging part is disposed at a specified position around said central axis with respect to a decentering direction toward a machine axis of said optical fiber with lens from said central axis.

9. The connector for optical fibers with lenses according to claim 7, wherein
said engaged part comprise a first engaged part provided on one end side of said sleeve and a second engaged part provided on another end side of said sleeve, said first and second engaged parts being disposed at positions 180° apart around said central axis.

10. The connector for optical fibers with lenses according to claim 1, wherein a back reflection of each optical fiber with lens is −50 dB or less.

11. A connector for optical fibers with lenses, comprising:
first and second ferrules having inclined end faces;
a coupling member coaxially coupling the first and second ferrules in a non-contact state such that first and second end faces of said first and second ferrules which face each other are parallel to each other and non-perpendicular to a central axis of the coupling member;
a first hole arranged in the first ferrule, said first hole having a center axis that is parallel to the central axis and that is off-set from the central axis;
a second hole arranged in the second ferrule, said second hole having a center axis that is parallel to the central axis and that is off-set from the central axis and from the center axis of the first hole;
a first optical fiber welded to a first GRIN lens mounted in the first hole of the first ferrule such that both the first optical fiber and the first GRIN lens are arranged in a same first hole; and
a second optical fiber welded to a second GRIN lens mounted in the second hole of the second ferrule such that both the second optical fiber and the second GRIN lens are arranged in a same second hole,
wherein each of the first and second GRIN lens comprises an inclined lens end face that are optically coupled to each other when light from one end face is emitted at an angle θ relative to a machine axis P passing through the one end face.

12. A connector for optical fibers with lenses, comprising:
a first ferrule having a first inclined end face, a central axis and a first opening whose center axis is off set from the central axis of the first ferrule;
a second ferrule having a second inclined end face, a central axis and a second opening whose center axis is off set from the central axis of the second ferrule;
a coupling member configured to coaxially couple the first and second ferrules such that the first and second inclined end faces are parallel and spaced from each other;
a first optical fiber having a first GRIN lens welded thereto arranged in the first opening;
a second optical fiber having a second GRIN lens welded thereto arranged in the second opening;
a first lens end face of the first optical fiber being inclined along the first inclined end face of the first ferrule; and
a second lens end face of the second optical fiber being inclined along the second inclined end face of the second ferrule,
wherein the first and second optical fibers are optically coupled to each other.

\* \* \* \* \*